United States Patent [19]

Carter, Jr.

[11] Patent Number: 4,478,964
[45] Date of Patent: Oct. 23, 1984

[54] POLYCARBONATE-SILICATE COMPOSITIONS

[75] Inventor: Russell P. Carter, Jr., New Martinsville, W. Va.

[73] Assignee: Mobay Chemical Corporation, Pittsburgh, Pa.

[21] Appl. No.: 334,668

[22] Filed: Dec. 29, 1981

Related U.S. Application Data

[63] Continuation-in-part of Ser. No. 270,708, Jun. 5, 1981, abandoned.

[51] Int. Cl.$^3$ ............................................. C08L 69/00
[52] U.S. Cl. ..................................... 523/216; 524/444; 524/445; 524/447; 524/448; 524/449; 524/450; 524/611
[58] Field of Search ............... 523/216; 524/445, 611, 524/789, 790, 791, 841, 444, 447, 448, 449, 450

[56] References Cited

U.S. PATENT DOCUMENTS

| | | | |
|---|---|---|---|
| 3,021,303 | 2/1962 | Jibben | 260/45.75 |
| 3,366,597 | 1/1968 | Fort | 524/447 |
| 3,398,212 | 8/1968 | Jackson, Jr. et al. | 528/125 |
| 3,419,460 | 12/1968 | Ure | 524/447 |
| 3,424,703 | 1/1969 | Jones | 523/216 |
| 3,479,318 | 11/1969 | Jackson et al. | 524/445 |
| 3,669,931 | 6/1972 | Annis et al. | 524/445 |
| 3,720,732 | 3/1973 | Sevenich | 260/860 |
| 3,764,576 | 10/1973 | Russo | 260/40 R |
| 3,876,608 | 4/1975 | Anderson et al. | 524/789 |
| 3,884,870 | 5/1975 | Dodson et al. | 524/444 |
| 4,070,330 | 1/1978 | Rawlings | 260/37 PC |
| 4,073,766 | 2/1978 | Fein et al. | 106/308 Q |
| 4,243,575 | 1/1981 | Myers et al. | 524/611 |
| 4,269,755 | 5/1981 | Holub et al. | 523/216 |
| 4,274,025 | 6/1981 | Nerurkar et al. | 310/215 |

FOREIGN PATENT DOCUMENTS

| | | |
|---|---|---|
| 1030752 | 5/1978 | Canada . |
| 1045808 | 1/1979 | Canada . |
| 2315887 | 4/1976 | Fed. Rep. of Germany . |

OTHER PUBLICATIONS

Goodman et al.; Polyesters, vol. 1, Saturated Polymers; London Iliffe Books Ltd.; 1965.

*Primary Examiner*—Lewis T. Jacobs
*Attorney, Agent, or Firm*—Gene Harsh; Lawrence S. Pope; Aron Preis

[57] ABSTRACT

Polycarbonate compositions comprising an aromatic polycarbonate resin, wherein dispersed are silicate particulates, are particularly suitable for the preparation of films having a low coefficient of static friction, high light transmission and virtual freedom from haze.

17 Claims, No Drawings

POLYCARBONATE-SILICATE COMPOSITIONS

This application is a continuation-in-part of my co-pending application Ser. No. 270,708, filed June 5, 1981, now abandoned.

FIELD OF THE INVENTION

The present invention is directed to polycarbonate compositions and, more particularly, to aromatic polycarbonate-silicate blends.

BRIEF DESCRIPTION OF THE INVENTION

A polycarbonate composition comprising an aromatic thermoplastic polycarbonate resin, wherein dispersed are silicate particulates, was found to be especially suitable for the preparation of films of low coefficient of static friction, high light transmission and virtual freedom from haze.

DESCRIPTION OF THE PRIOR ART

Polycarbonates derived from reaction involving organic dihydroxy compounds and carbonic acid derivatives have found extensive commercial application because of their excellent mechanical and physical properties. These thermoplastic polymers are particularly suited for the manufacture of molded articles for which impact strength, rigidity, toughness, thermal and dimensional stability as well as excellent electrical properties are required. Furthermore, polycarbonates are eminently suited for casting or extrusion into films which are characteristically of high clarity, color and oxidative stability as well as flame resistant.

One deficiency of polycarbonate-based films has been the high coefficient of static friction, a factor effecting their handling and somewhat restricting their usefulness. It has been the experience of those skilled in the art that the surfaces of films tend to stick when they are made to slide over similar surfaces, a tendency sometimes referred to as "blockiness", due largely to their high coefficient of static friction.

In this connection, see "Slip and Antiblock Agents—A Guide to Their Use", by H. W. Mock et al., Plastics Technology, August 1974, page 41; "Slip and Antiblocking Agents—Attaining that Delicate Balance", by A. M. Birks, Plastics Technology, July 1977, page 131; and "Does the slip of your web help or hurt its performance?", by R. L. Mueller, Package Engineering, April 1973, page 61.

Attempts to lower that friction by chemical modifiers are not entirely satisfactory in that such modifications adversely affect other, desirable properties of the films. U.S. Pat. No. 3,424,703 teaches lowering the coefficient of friction of polycarbonate films by adding small amounts of either silica or talc. One notable disadvantage entailed in the use of silica relates to the limit of about 1 phr that may be incorporated in polycarbonates before processing difficulties are encountered. It is thus an object of the present invention to provide a polycarbonate-silicate composition of improved processability suitable for the preparation of films of low static coefficient of friction. It is a further object to provide a polycarbonate-silicate concentrate composition comprising up to about 5 phr silicate.

DETAILED DESCRIPTION OF THE INVENTION

The polycarbonate resins useful in the practice of the invention are homopolycarbonates, copolycarbonates and terpolycarbonates or mixtures thereof. The polycarbonates generally have molecular weights of 10,000–200,000 (weight average molecular weight) preferably 20,000–80,000, and are additionally characterized by their melt flow of 1–24 gm/10 min. at 300° C. per ASTM D-1238. These polycarbonates may be prepared, for example, by the known diphasic interface process from phosgene and bisphenols by polycondensation (see German OS Nos. 2,063,050; 2,063,052; 1,570,703; 2,211,956; 2,211,957 and 2,248,817 and French Pat. No. 1,561,518, and the monograph, "H. Schnell, Chemistry and Physics of Polycarbonates, Interscience Publishers, New York, 1964", all incorporated herein by reference).

The aromatic polycarbonates may be based on the following bisphenols: hydroquinone, resorcinol, dihydroxy diphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and α,α'-bis-(hydroxyphenyl)-diisopropyl benzenes, as well as the corresponding compounds substituted in the nucleus. These and other suitable aromatic dihydroxy compounds have been described in U.S. Pat. Nos. 3,028,365; 2,999,835; 3,148,172; 3,271,368; 2,991,273; 3,271,367; 3,780,078; 3,014,891 and 2,999,846 and in German OS Nos. 1,570,703; 2,063,050 and 2,063,052 and in French Pat. No. 1,561,518, all incorporated herein by reference.

Preferred aromatic polycarbonates are those in which 5–100 mol % of the structural units correspond to formula (1):

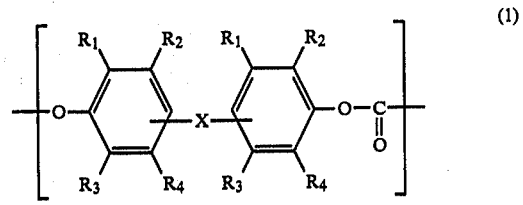

wherein $R_1$, $R_2$, $R_3$ and $R_4 = C_1-C_{10}$ alkyl, Cl, Br, phenyl and H, X = a single bond, —O—, —CO—, S, SO, —SO$_2$—, —C$_1$–C$_{10}$ alkylene, C$_1$–C$_{10}$ alkylidene, C$_5$–C$_{15}$ cycloalkylene, C$_5$–C$_{15}$ cycloalkylidene, C$_7$–C$_{20}$ cycloalkyl alkylene, C$_6$–C$_{20}$ cycloalkyl alkylidene or

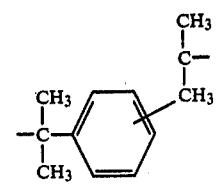

and/or formula (2)

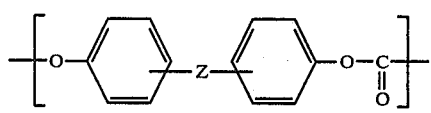

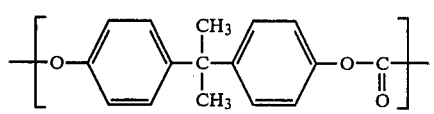

wherein Z=C$_5$-C$_{20}$ alkylene, C$_5$-C$_{20}$ alkylidene, C$_5$-C$_{15}$ cycloalkylene, C$_5$-C$_{15}$ cycloalkylidene, C$_7$-C$_{20}$ cycloalkyl alkylene or C$_6$-C$_{20}$ cycloalkyl alkylidene.

Aromatic polycarbonates containing 5–30 mol % of structural units of formula (1) and/or (2) as well as those containing 50–100 mol % of these structural units are particularly preferred.

Preferred structural units of formula (1) are those of formula (3):

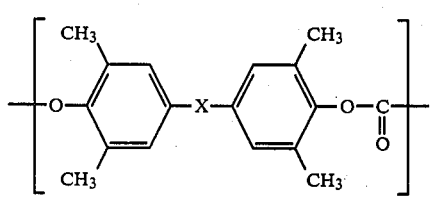

wherein X is as defined above.

The structural units of formula (3) may be based on the following bisphenols, for example: bis-(3,5-dimethyl-4-hydroxyphenyl); bis-(3,5-dimethyl-4-hydroxyphenyl)-ether; bis-(3,5-dimethyl-4-hydroxyphenyl)-carbonyl; bis-(3,5-dimethyl-4-hydroxyphenyl)-sulphone; bis-(3,5-dimethyl-4-hydroxyphenyl)-methane; 1,1-bis-(3,5-dimethyl-4-hydroxyphenyl)-ethane; 1,1-bis-(3,5-dimethyl-4-hydroxyphenyl)-propane; 2,2-bis-(3,5-dimethyl-4-hydroxyphenyl)-butane; 2,4-bis-(3,5-dimethyl-4-hydroxyphenyl)-2-methyl butane; 2,4-bis-(3,5-dimethyl-4-hydroxyphenyl)-butane; 3,3-bis-(3,5-dimethyl-4-hydroxyphenyl)-pentane; 3,3-bis-(3,5-dimethyl-4-hydroxyphenyl)-hexane; 4,4-bis-(3,5-dimethyl-4-hydroxyphenyl)-heptane; 2,2-bis-(3,5-dimethyl-4-hydroxyphenyl)-octane; 2,2-bis-(3,5-dimethyl-4-hydroxyphenyl)-nonane; 2,2-bis-(3,5-dimethyl-4-hydroxyphenyl)-decane; 1,1-bis-(3,5-dimethyl-4-hydroxyphenyl)-cyclohexane; 1,4-bis-(3,5-dimethyl-4-hydroxyphenyl)-cyclohexane; α,α'-bis-(3,5-dimethyl-4-hydroxyphenyl)-p-diisopropyl benzene; and α,α'-bis-(3,5-dimethyl-4-hydroxyphenyl)-m-diisopropyl benzene.

Those structural units of formulae (1) and (2) which are based on the following bisphenols are particularly preferred: bis-(3,5-dimethyl-4-hydroxyphenyl)-methane; 2,2-bis-(3,5-dimethyl-4-hydroxyphenyl)-propane; 2,4-bis-(3,5-dimethyl-4-hydroxyphenyl)-2-methyl butane; 1,1-bis-(3,5-dimethyl-4-hydroxyphenyl)-cyclohexane; α,α'-bis-(3,5-dimethyl-4-hydroxyphenyl)-p-diisopropyl benzene; 2,2-bis-(3,5-dichloro-4-hydroxyphenyl)-propane, 2,2-bis-(3,5-dibromo-4-hydroxyphenyl)-propane; 1,1-bis-(4-hydroxyphenyl)-cyclohexane; α,α'-bis-(4-hydroxyphenyl)-m-diisopropyl benzene; α,α'-bis-(4-hydroxyphenyl)-p-diisopropyl benzene; 2,4-bis-(4-hydroxyphenyl)-2-methyl butane; 2,2-bis-(3-methyl-4-hydroxyphenyl)-propane; and 2,2-bis-(3-chloro-4-hydroxyphenyl)-propane.

In addition to containing structural units of formulae (1) and (2), the preferred polycarbonates preferably contain structural units of formula (4):

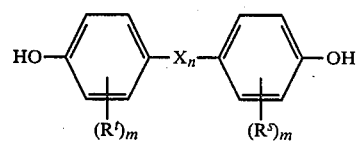

Polycarbonates based solely on the above-mentioned o,o,o',o'-tetramethyl-substituted bisphenols are particularly important; in particular, the homopolycarbonate based on 2,2-bis-(3,5-dimethyl-4-hydroxyphenyl)-propane.

Also suitable for the preparation of the polycarbonates of the invention are dihydroxybenzenes of the structural formula:

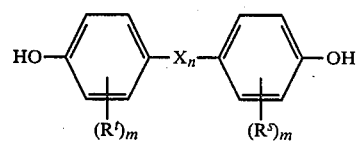

wherein R$^t$ and R$^s$ independently denote C$_1$-C$_{10}$ alkyls, m is an integer of from 0 to 2, X is

or S and n is either 0 or 1.

Among the resins suitable in the practice of the invention are included phenolphthalic-based polycarbonate, copolycarbonates and terpolycarbonates such as are described in U.S. Pat. Nos. 3,036,036 and 4,210,741, both incorporated by reference herein.

In order to obtain special properties, mixtures of various di-(monohydroxyaryl)-alkanes can also be used; thus mixed polycarbonate resins are obtained. By far the most useful polycarbonate resins are those based on 4,4'-dihydroxydiaryl methanes and more particularly bisphenol A [2,2-(4,4'-dihydroxydiphenyl)-propane]. Thus, when flame retardant characteristics are to be imparted to the basic polycarbonate resin, a mixture of bisphenol A and tetrabromobisphenol A [2,2-(3,5,3',5'-tetrabromo-4,4'-dihydroxydiphenyl)-propane] is utilized when reacting with phosgene or a like cationic acid derivative. Other halogenated phenolic diols are any suitable bis-hydroxyaryl such as the halogenated containing bisphenols such as 2,2'-(3,3,3',5'-tetrachloro-4,4'-dihydroxydiphenyl)-propane; 2,2-(3,5,3',5'-tetrabromo-4,4'-dihydroxydiphenyl)-propane; 2,2-(3,5-dichloro-4,4'-dihydroxy-diphenyl)-propane; 2,2-(3,3'-dichloro-5,5'-dimethyl-4,4'-dihydroxyphenyl)-propane; 2,2-(3,3'-dibromo-4,4'-dihydroxydiphenyl)-propane and the like. These halogenated diols are incorporated into the polycarbonates at levels sufficient to impart flame retardant characteristics. For example, a halogen content of about 3 to 10% by weight is normally sufficient.

The polycarbonates of the invention may also be branched by incorporating small quantities of polyhydroxyl compounds in them by condensation, e.g., 0.05–2.0 mol % (based on the quantity of bisphenols used). Polycarbonates of this type have been described, for example, in German OS Nos. 1,570,533; 2,116,974 and 2,113,347, British Pat No. 885,442 and 1,079,821 and U.S. Pat. Nos. 3,544,514 and 4,185,009, all incorporated by reference herein. The following are some examples of polyhydroxyl compounds which may be used for this purpose: phloroglucinol; 4,6-dimethyl-2,4,6-tri-(4-hydroxyphenyl)-heptane-2; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenyl-methane; 2,2-bis-[4,4-(4,4'-dihydroxydiphenyl)-cyclohexyl]-propane; 2,4-bis-(4-hydroxyphenyl-4-isopropyl)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxy-phenyl)-propane; 1,4-bis-(4',4''-dihydroxytriphenylmethyl)-benzene and 3,3-bis-(4-hydroxyphenyl-oxindole.

In addition to the polycondensation process mentioned above and which essentials are described below, other processes for the preparation of the polycarbonates of the invention are polycondensation in a homogeneous phase and transesterification. The suitable processes are disclosed in the incorporated herein by reference U.S. Pat. Nos. 3,028,365; 2,999,846; 3,248,414; 3,153,008; 3,215,668; 3,187,065; 2,064,974; 2,070,137; 2,991,273 and 2,000,835.

The preferred process is the interfacial polycondensation process.

According to the interfacial polycondensation process, copolycarbonate resins are obtained by reacting the aromatic dihydroxy compounds with an alkali metal hydroxide or alkaline earth metal oxide or hydroxide to form the salt of the hydroxy compounds. The salt mixture is present in an aqueous solution or suspension and is reacted with phosgene, carbonyl bromide or bis-chloroformic esters of the aromatic dihydroxy compounds. An organic solvent is provided in the reaction admixture which is a solvent for the polymer but not for the aromatic dihydroxy salts. Thus, chlorinated aliphatic hydrocarbons or chlorinated aromatic hydrocarbons are used as the organic solvent which dissolves the condensation product. In order to limit the molecular weight one may use monofunctional reactants such as monophenols, for example the propyl-, isopropyl- and butyl-phenols, especially p-tert-butylphenol and phenol itself. In order to accelerate the reaction, catalysts such as tertiary amines, quaternary ammonium, phosphonium or arsonium salts and the like may be used. The reaction temperature should be about $-20°$ to $+150°$ C., preferably 0° to about 100° C.

According to the polycondensation process in a homogeneous phase, the dissolved reaction components are polycondensed in an inert solvent in the presence of an equivalent amount of a tertiary amine base required for absorption of the generated HCl, such as, e.g., N,N-dimethyl-aniline; N,N-dimethyl-cyclohexylamine or, preferably, pyridine and the like. In still another process, a diaryl carbonate can be transesterified with the aromatic dihydroxy compounds to form the polycarbonate resin.

It is to be understood that it is possible to combine in the processes described above in a chemically meaningful way both the aromatic dihydroxy compounds and the monohydroxy compounds in the form of the alkali metal salts and/or bis-haloformic acid esters and the amount of phosgene or carbonyl bromide then still required in order to obtain high molecular products. Other methods of synthesis in forming the polycarbonates of the invention such as disclosed in U.S. Pat. No. 3,912,688, incorporated herein by reference, may be used.

In the context of the present invention silicates are aluminosilicates either hydrous (clays) or anhydrous (Feldspars) as well as the sillimanite group of minerals (conforming to $Al_2SiO_5$) and Wollastonite (conforming to $CaSiO_3$).

Silicates useful in the practice of the invention may be surface treated, such as by the application of coupling agents thereon to render improved compatibility with the polycarbonate matrix.

Clays are aluminum silicate minerals characterized by their crystal structure and chemical makeup and are widely known and used in a variety of applications.

In the practice of the invention, clays, preferably calcined clays, may be used provided their moisture content does not exceed 2.0%, preferably 0.5%.

Among the clays suitable in the context of the present invention are bentonite, such as is available from Whittaker, Clark & Daniels, Inc. of South Plainfield, N.J., under the tradename 660 Bentonite, and calcined kaolin, such as is available from Engelhard Minerals & Chemicals Corporation of Edison, N.J., under the tradename Satintone, as well as from other commercial sources some of which are referred to in the working examples of this disclosure. Typically, calcined kaolin suitable in the practice of the invention is characterized by the properties listed below:

| | |
|---|---|
| Average particle size, microns | 0.8 |
| Residue 325 mesh, max. % | 0.01 |
| Oil absorption (ASTM DZ 81-31) | 85–95 |
| Oil absorption (Gardner Coleman) | 100–120 |
| Color (G.E. brightness) | 90–92 |
| Refractive index | 1.62 |
| Specific gravity | 2.63 |
| pH | 4.5–5.5 |
| Bulking value: lbs./gal. | 21.9 |
| Bulk density, lbs./ft.$^3$: loose | 10–15 |
| firm | 15–20 |
| Free moisture, max. % | 0.5 |

Other silicates suitable in the context of the present invention are synthetic sodium aluminum silicates such as are available in commerce from Degussa Corporation of Teterboro, N.J. under the tradename Sipernat ® 44. Conforming approximately to the formula $Na_2O—Al_2O_3—2SiO_2—4H_2O$, Sipernat ® 44 is characterized by the properties listed below.

| Property | Test Method | |
|---|---|---|
| Medium size of aggregates | DIN 51 033 (Andreasen) | 3–4 μm |
| Sieve residue (Mocker, 45 μm) | DIN 53 580 | <0.1% |
| Tamped density | DIN 53 194 | approx. 450 g/l |
| Drying loss (2 hrs. at 105° C.) | DIN 55 921 | —** |
| Ignition loss*** (1 hr. at 800° C.) | DIN 55 921 | approx. 20% |
| pH-value (in 5% aqueous dispersion) | DIN 53 200 | approx. 11.8 |
| Sio$_2$* | | approx. 42% |
| Al$_2$O$_3$* | | approx. 36% |
| Na$_2$O* | | approx. 22% |
| Fe$_2$O$_3$* | | approx. 0.02% |

*referred to the substance ignited for 1 hr. at 800° C.
**measured values are not consistent
***total ignition loss, referred to the original substance Generally, the silicates suitable in the practice of the invention may range in their average particle size from about 0.05 to about 20 microns, preferably from 0.075 to about 15 microns and most preferably from 0.075 to about 5 microns.

The polycarbonate compositions of the invention may incorporate from 0.025 to 5 phr silicates and be thus particularly suitable as concentrates to be diluted by admixing with polycarbonate resin to a predetermined loading.

Further, the polycarbonate compositions of the invention may incorporate 0.025 phr to about 1.0 phr, preferably 0.025 to about 0.1 phr, of silicates and be thus particularly suitable for the preparation of films which are characterized by their low static coefficient of friction.

Although the results tabulated below, wherein summarized are test results indicative of the inventive concept, are believed clear, the following notes are offered by way of further elucidation:

The results reported in the tables were obtained upon testing of the solution cast films and as is well known in the art, these results are indicative of trends to be expected upon the evaluation of extruded films. It should further be noted that the values of the coefficient of friction thus obtained are significantly higher than the values obtainable upon testing the corresponding extruded films. Accordingly, $\mu s$ and $\mu k$ are respectively the static and kinetic coefficients of friction as measured per ASTM D-1894-78. The symbols O-O, O-I and I-I are significant in identifying the surface of the sample tested. The films whose properties are reported below were all cast from solution onto glass and the "air side" of the film is designated as O while the glass side is designated I. The "torture test" is conducted on a 3 oz. injection molding machine at a temperature of 725° F. and molding cycles of one minute and is designed to test the thermal stability of a resinous composition. A skilled operator may determine, by evaluating the parts molded under the processing parameters above, whether the composition suffers thermal degradation, for instance, upon the incorporation of additives thereto. A subjective evaluation indicative of the sufficiency of thermal stability is reported in the table below.

Measurements of melt flow were carried out as an added criteria indicating structural or chemical changes that may occur upon the incorporation of the silicate additive. An abnormal change in flow, which may indicate depolymerization or cross-linking may point to processing difficulties which can be expected upon the extruding of the compound into films. Surprisingly, the silicates used in the present invention appears to bring about a degree of improved thermal stability to the silicate-polycarbonate system.

The compositions of polycarbonate silicates of the invention are prepared by blending a polycarbonate resin with a predetermined amount of suitable silicate to provide a homogeneous dispersion thereof in the resin. Such blending may be carried out in any of suitable blenders or mixers commonly used in the art. The preparation of films by the solution casting method, extrusion and by blow molding techniques are described in the monograph, "Chemistry and Physics of Polycarbonates", H. Schnell, Interscience Publishers, 1964, and in "Polycarbonates", by Christopher and Fox, Rheinhold Publishing Corporation, 1962, both incorporated by reference herein. The compositions of the instant invention are suitable for the preparation of thin films (less than 10 mils) of excellent clarity and low static coefficient of friction.

The polycarbonate resin used in the course of the experiments is HMS 3119, a branched polycarbonate resin of 1.29–1.30 relative viscosity (measured on 0.5% solution in methylene chloride) and having a melt flow rate of 1.5–2.5 g/10 min., per ASTM-D 1238 and is a product of Mobay Chemical Corporation. The coefficient of static friction (O-O) of HMS 3119 is about 10.0. The haze and light transmission values of HMS 3119 are 0.4% and 91.9% respectively. The thickness of the films which properties are tabulated below was 1 mil.

TABLE 1

| Additive (1) | Satintone #5 (2) | | | Satintone Special (2) | | | Satintone X-2211 (3) | | | Optiwhite (4) | | |
|---|---|---|---|---|---|---|---|---|---|---|---|---|
| Example | A | B | C | D | E | F | G | H | I | J | K | L |
| Amount of additive, phr. | 1.0 | 0.5 | 0.1 | 1.0 | 0.5 | 0.1 | 1.0 | 0.5 | 0.1 | 1.0 | 0.5 | 0.1 |
| Melt flow (6) | 3.1 | 2.4 | 2.3 | 3.0 | 2.3 | 2.5 | 2.6 | 2.7 | 2.4 | 3.2 | 2.5 | 3.1 |
| Torture test (7) | F | F | E | F | E | E | F | G | E | F | G | E |
| Coefficient of friction (8) | | | | | | | | | | | | |
| O—O, | | | | | | | | | | | | |
| $\mu s$ | .650 | 1.60 | 1.53 | .477 | 1.02 | 3.08 | .660 | 1.39 | 5.18 | .807 | .558 | 5.18 |
| $\mu k$ | .751 | .635 | .548 | .518 | .492 | .812 | .645 | 1.04 | .761 | .706 | .508 | .609 |
| O—I, | | | | | | | | | | | | |
| $\mu s$ | .462 | 1.80 | .594 | .482 | .695 | 4.36 | .477 | 2.94 | 4.38 | .533 | .406 | 2.41 |
| $\mu k$ | .584 | .604 | .609 | .508 | .508 | .711 | .523 | .812 | .635 | .558 | .498 | .558 |
| I—I, | | | | | | | | | | | | |
| $\mu s$ | .588 | .513 | .558 | .558 | .548 | .645 | .711 | .695 | .492 | 1.37 | .457 | 2.94 |
| $\mu k$ | .802 | .558 | .711 | .660 | .660 | .782 | 1.12 | .853 | .492 | .939 | .685 | .533 |
| Light transmission, % (9) | 91.7 | 91.7 | 91.6 | 91.8 | 91.7 | 91.7 | 91.6 | 91.8 | 91.7 | 91.4 | 91.6 | 91.9 |
| Haze, % (9) | 1.1 | .9 | 1.1 | 1.7 | .9 | .6 | 1.6 | 1.4 | .4 | 3.8 | 2.6 | .9 |

| Additive (1) | Pigment #40 (4) | | | 2459 Clay (5) | | | Bentone 660 (10) | | |
|---|---|---|---|---|---|---|---|---|---|
| Example | M | N | O | P | Q | R | S | T | U |
| Amount of additive, phr. | 1.0 | 0.5 | 0.1 | 1.0 | 0.5 | 0.1 | 1.0 | 0.5 | .1 |
| Melt flow (6) | 3.2 | 2.7 | 2.5 | 3.9 | 3.1 | 2.6 | | | |
| Torture test (7) | G | F | G | F | F | E | | | |
| Coefficient of friction (8) | | | | | | | | | |
| O—O, | | | | | | | | | |
| $\mu s$ | .599 | .558 | 9.70 | .690 | 1.59 | 5.18 | 0.909 | 5.18 | 9.85 |
| $\mu k$ | .452 | .675 | .462 | .619 | .528 | .711 | 1.02 | 0.761 | — |
| O—I, | | | | | | | | | |
| $\mu s$ | .477 | .721 | 2.80 | 1.51 | 1.74 | 5.18 | 1.60 | 4.68 | 2.45 |
| $\mu k$ | .503 | .675 | .508 | .579 | .609 | .695 | .716 | 0.761 | 0.457 |

TABLE 1-continued

| | | | | | | | | | |
|---|---|---|---|---|---|---|---|---|---|
| I—I, | | | | | | | | | |
| $\mu_s$ | .432 | .594 | .685 | .624 | .396 | .635 | 2.85 | 0.761 | 1.25 |
| $\mu_k$ | .533 | .736 | .584 | .594 | .432 | .711 | 1.07 | 1.47 | 1.52 |
| Light transmission, % (9) | 91.7 | 91.8 | 91.7 | 91.7 | 91.8 | 91.9 | | | |
| Haze, % (9) | .7 | .6 | .5 | 1.0 | .7 | .4 | | | |

Notes to table:
(1) The clay additives were blended in a polycarbonate resin HMS 3119, Mobay Chemical Corporation.
(2) Calcined kaolin, from Engelhard Minerals & Chemicals Corporation, Edison, New Jersey
(3) Silane treated Satintone
(4) Hydrous kaolin from Burgess Pigment Company, Sandersville, Georgia
(5) Ground calcined kaolin from Whittaker, Clark & Daniels, Inc., South Plainfield, New Jersey
(6) Per ASTM D-1238
(7) See explanatory note in the specification;
F - fair; G - good; E - excellent
(8) Per ASTM D-1894-78
(9) Per ASTM D-1003-61
(10) Bentonite from Whittaker, Clark & Daniels, Inc., South Plainfield, New Jersey.

Films according to the invention comprising aluminum silicate (synthetic) Table 2 and Wollastonite Table 3 were prepared and tested as presented below.

TABLE 2

PROPERTIES OF CAST FILMS MADE OF POLYCARBONATE/SILICATE COMPOSITIONS

| | 1 | 2 | 3 | 4 |
|---|---|---|---|---|
| Polycarbonate resin (pbw) | 100(1) | 100(2) | 100(1) | 100(2) |
| Silicate(3) (pbw) | 1.0 | 1.0 | — | — |
| Compositions melt flow(4), gm/10 min. | 3.1 | 3.4 | 2.0 | — |
| Pellet r.v. | 1.291 | 1.302 | 1.29 | — |
| Film properties | | | | |
| Haze, % | 4.4 | 5.1 | 0.4 | 0.2 |
| Light transmission, % | 91.6 | 91.6 | 91.9 | 91.8 |
| Coefficient of Friction | | | | |
| O—O | | | | |
| $\mu_s$ | 0.716 | 5.94 | 10.0 | 10.36 |
| $\mu_k$ | 0.761 | .528 | — | — |
| O—I | | | | |
| $\mu_s$ | 1.52 | 0.564 | | 8.53 |
| $\mu_k$ | 0.888 | 0.508 | | 0.812 |
| I—I | | | | |
| $\mu_s$ | 10.15 | 0.787 | | 6.35 |
| $\mu_k$ | — | 1.19 | | 0.508 |

(1) Merlon HMS 3119
(2) Merlon M-50
(3) Sipernat ®44
(4) Per ASTM D-1238

TABLE 3

PROPERTIES OF CAST FILMS MADE OF POLYCARBONATE/WOLLASTONITE COMPOSITIONS

| | | | | | | | | | |
|---|---|---|---|---|---|---|---|---|---|
| Polycarbonate resin(1), pbw | 100 | 100 | 100 | 100 | 100 | 100 | 100 | 100 | 100 |
| Wollastonite(2), pbw | 1.0 | 0.5 | 0.1 | — | — | — | — | — | — |
| Wollastonite(3), pbw | — | — | — | 1.0 | 0.5 | 0.1 | — | — | — |
| Wollastonite(4), pbw | — | — | — | — | — | — | 1.0 | 0.5 | 0.1 |
| Compositions Melt Flow gm/10 min. | 9.5 | 9.4 | 9.5 | 9.3 | 9.3 | 9.6 | 11.9 | 10.6 | 9.6 |
| Torture Test(5) | G | E | E | E | G | E | G | G | G |
| Light Transmission, % | 91.9 | 91.9 | 91.9 | 91.9 | 91.9 | 92.0 | 91.9 | 91.9 | 91.9 |
| Haze, % | .6 | .6 | .3 | .7 | .6 | .4 | .9 | .6 | .6 |
| Coefficient of Friction | | | | | | | | | |
| O—O | | | | | | | | | |
| $\mu_s$ | 5.18 | 7.28 | 5.18 | 5.18 | 6.08 | 6.37 | .848 | 1.90 | 8.05 |
| $\mu_k$ | .457 | .508 | .508 | .508 | .457 | .406 | .660 | .432 | .406 |
| O—I | | | | | | | | | |
| $\mu_s$ | 2.70 | 4.14 | •2.71 | 4.97 | 2.12 | 3.57 | .711 | 1.29 | 2.84 |
| $\mu_k$ | .482 | .508 | .609 | .523 | .558 | .457 | .645 | .457 | .406 |
| I—I | | | | | | | | | |
| $\mu_s$ | .482 | .533 | .579 | .482 | .914 | .432 | .518 | .508 | .482 |
| $\mu_k$ | .508 | .508 | .584 | .508 | .584 | .538 | .761 | .487 | .457 |

(1) Merlon M-40 from Mobay Chemical Corporation
(2) G-Wollastokup 3076-1.0, silane coated from NYCO Division of Processed Minerals, Inc, - 3.5μ
(3) G-Wollastokup KR-0.5, from NYCO Division of Processed Minerals, Inc. - 3.5μ
(4) Wollastonite SW Type A, AKKAT - West Germany, 0.25/0.63μ particle size
(5) See explanatory note in the disclosure.

What is claimed is:

1. A polycarbonate film comprising
    (i) an aromatic thermoplastic polycarbonate resin, and
    (ii) between 0.025 to 5 phr of a silicate having an average particle size of about 0.05 to about 20 microns, said silicate selected from the group consisting of hydrous alumino silicates, anhydrous alumino silicates, sillimanite minerals and wollastonite.

2. The composition of claim 1, wherein said silicate is calcined clay.

3. The composition of claim 1 or 2, wherein said (ii) is between 0.025 and 1 phr.

4. The composition of claim 1 or 2, wherein said particle size is about 0.075 to about 5 microns.

5. The composition of claim 1, wherein said silicate is treated with a coupling agent.

6. The composition of claim 1 or 5, wherein said (i) is a bisphenol-A based polycarbonate.

7. In the solution cast process for the preparation of films, the improvement comprising using a polycarbonate composition comprising
    (i) an aromatic thermoplastic polycarbonate resin, and
    (ii) between 0.025 to 5 phr of a silicate having an average particle size of about 0.05 to about 20 microns, said silicate selected from the group consisting of hydrous alumino silicates, anhydrous alumino silicates, sillimanite minerals and wollastonite.

8. The process of claim 7, wherein said silicate is calcined clay.

9. The process of claim 7, wherein said silicate is treated with a coupling agent.

10. In the extrusion process for the preparation of films, the improvement comprising using a polycarbonate composition comprising
   (i) an aromatic thermoplastic polycarbonate resin, and
   (ii) between 0.025 to 5 phr of a silicate having an average particle size of about 0.05 to about 20 microns, said silicate selected from the group consisting of hydrous alumino silicates, anhydrous alumino silicates, sillimanite minerals and wollastonite.

11. The process of claim 10, wherein said silicate is calcined clay.

12. The process of claim 10, wherein said silicate is treated with a coupling agent.

13. In the blow molding process for the preparation of films, the improvement comprising using a polycarbonate composition comprising
   (i) an aromatic thermoplastic polycarbonate resin, and
   (ii) between 0.025 to 5 phr of a silicate having an average particle size of about 0.05 to about 20 microns, said silicate selected from the group consisting of hydrous alumino silicates, anhydrous alumino silicates, sillimanite minerals and wollastonite.

14. The process of claim 13, wherein said silicate is calcined clay.

15. The process of claim 13, wherein said silicate is treated with a coupling agent.

16. Thin, aromatic polycarbonate films of the composition of claim 1 or 2.

17. The films of claim 16 having thicknesses of about 10 mils or less.

* * * * *

UNITED STATES PATENT AND TRADEMARK OFFICE
CERTIFICATE OF CORRECTION

PATENT NO. : 4,478,964          Page 1 of 4
DATED      : October 23, 1984
INVENTOR(S) : RUSSELL P. CARTER, JR.

It is certified that error appears in the above-identified patent and that said Letters Patent is hereby corrected as shown below:

Column 4, line 48  delete "cationic" and substitute --carbonic--.

Claim 1, line 4  (line 21 of column 10) delete "to 5 phr" and substitute, --and 1 phr--;

Claim 2, line 1 (line 27 of column 10) delete "composition" and substitute --film--;

Claim 3, lines 1 and 2 (lines 29 and 30 of column 10) delete entirely;

Claim 4, line 1 (line 31 of column 10) delete "composition" and substitute --film--; delete "claim 1 or 2" and substitute --claim 1--;

Claim 5, line 1 (line 33 of column 10) delete "composition" and substitute --film--;

Claim 6, line 1 (line 35 of column 10) delete "composition" and substitute --film--; delete "claim 1 or 5" and substitute --claim 1--;

Claim 7, line 6  (line 42 of column 10) delete "5 phr" and substitute --1.0 phr--;

Claim 10, line 6  (line 15 of column 11) delete "5 phr" and substitute --1.0 phr--;

Claim 13, line 6  (line 8 of column 12) delete "5 phr" and substitute --1.0 phr--;

UNITED STATES PATENT AND TRADEMARK OFFICE
CERTIFICATE OF CORRECTION

PATENT NO. : 4,478,964

DATED : October 23, 1984

INVENTOR(S) : RUSSELL P. CARTER, JR.

It is certified that error appears in the above-identified patent and that said Letters Patent is hereby corrected as shown below:

Claim 16, lines 1 and 2 (lines 18 and 19 of column 12) delete entirely;

Claim 17, line 1 (line 20 of column 12) delete "films" and substitute --film--; delete "claim 16" and substitute --claim 1--; delete "thicknesses" and substitute --a thickness--

The following Claims, Claims 18-23 are inserted:

18. A polycarbonate film comprising
    (i) an aromatic thermoplastic polycarbonate resin, and
    (ii) between 0.025 to 1.0 phr of a silicate having an average particle size of about .075 to about 15 microns, said silicate selected from the group consisting of hydrous alumino silicates, anhydrous alumino silicates, sillimanite minerals and wollastonite.

19. The film of Claim 18 wherein said silicate is calcined clay.

20. The film of Claim 19 wherein said calcined clay is treated with a coupling agent.

21. In the solution cast process for the preparation of films, the improvement comprising using a polycarbonate composition comprising
    (i) an aromatic thermoplastic polycarbonate resin, and
    (ii) between .025 to 1.0 phr of a silicate having an average particle size of about .075 to about 15 microns, said silicate selected from the group

UNITED STATES PATENT AND TRADEMARK OFFICE
CERTIFICATE OF CORRECTION

PATENT NO. : 4,478,964

DATED : October 23, 1984

INVENTOR(S) : RUSSELL P. CARTER, JR.

It is certified that error appears in the above-identified patent and that said Letters Patent is hereby corrected as shown below:

consisting of hydrous alumino silicates, anhydrous alumino silicates, sillimanite minerals and wollastonite.

22. In the extrusion process for the preparation of films the improvement comprising using a polycarbonate composition comprising (i) an aromatic thermoplastic polycarbonate resin, and (ii) between .025 to 1.0 phr of a silicate having an average particle size of about .075 to about 15 microns, said silicate selected from the group consisting of hydrous alumino silicates, anhydrous alumino silicates, sillimanite minerals and wollastonite 23. In the blow molding process for the preparation of films, the improvement comprising using a polycarbonate composition comprising (i) an aromatic thermoplastic polycarbonate resin, and (ii) between .025 to 1.0 phr of a silicate having an average particle size of about .075 to about 15 microns, said silicate selected from the group consisting of

UNITED STATES PATENT AND TRADEMARK OFFICE
CERTIFICATE OF CORRECTION

PATENT NO. : 4,478,964

DATED : October 23, 1984

INVENTOR(S) : RUSSELL P. CARTER, JR.

It is certified that error appears in the above-identified patent and that said Letters Patent is hereby corrected as shown below:

```
     hydrous alumino silicates, anhydrous alumino silicates,
     sillimanite minerals and wollastonite.
```

Signed and Sealed this

Thirty-first Day of May, 1988

Attest:

DONALD J. QUIGG

Attesting Officer

Commissioner of Patents and Trademarks